Oct. 31, 1933.  E. F. SKINNER  1,932,712
APPARATUS FOR DISTILLING HYDROCARBON OR OTHER LIQUIDS
Filed April 2, 1931
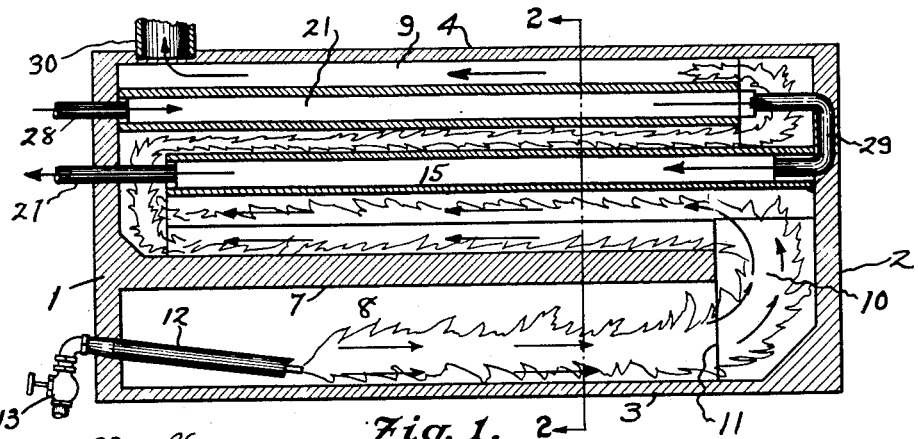
Fig. 1.
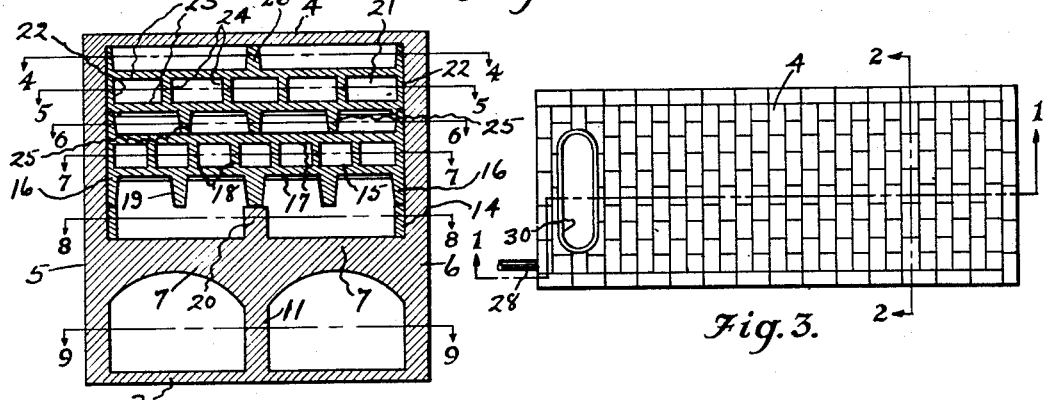
Fig. 2.  Fig. 3.
Fig. 4.  Fig. 5.  Fig. 6.  Fig. 7.  Fig. 8.  Fig. 9.
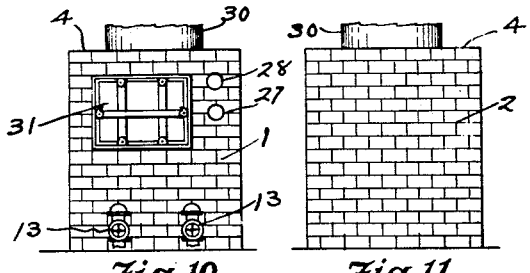
Fig. 10.  Fig. 11.
INVENTOR.
Earnest Frederick Skinner
BY
Louis C. Vanderlip.
ATTORNEY.

Patented Oct. 31, 1933

1,932,712

UNITED STATES PATENT OFFICE 1,932,712

APPARATUS FOR DISTILLING HYDROCARBON OR OTHER LIQUIDS

Earnest Frederick Skinner, Los Angeles, Calif.

Application April 2, 1931. Serial No. 527,232

2 Claims. (Cl. 196—116)

This invention relates to improvements in apparatus for distilling hydrocarbons or other liquids.

It is an object of the invention to provide a distilling apparatus particularly suitable for the cracking of hydrocarbons, wherein the combustion gases of a furnace are fully utilized by surrendering a portion of their heat when they have the maximum temperature, and by surrendering subsequently another portion before they are discharged from the apparatus.

It is also an object of the invention to utilize the combustion gases of a furnace most economically by effecting first through said combustion gases a preheating of the vapors to be acted on, and subsequently a superheating of said vapors, which last named operation brings about the desired decomposition or cracking of the hydrocarbons or other liquids.

Another object of the invention is to utilize the thermal efficiency of the combustion gases to the highest degree by compelling said gases to flow in a tortuous path in contact with walls of passages wherein the vapors or gases to be acted on are caused to flow, the maximum economy being attained owing to the long path over which the influence of the combustion gases is exerted on said vapors or gases to be cracked.

It is, furthermore, an object of the present invention to produce a distilling apparatus of particular usefulness in the cracking of hydrocarbons in vapor phase, wherein the combustion gases from a furnace are caused to travel partly in the same direction as, and partly in counterflow with the vapors and gases to be cracked, whereby the longest possible path of action for the combustion gases is provided and whereby, therefore, the period of flow of the vapors or gases through the furnace may be reduced.

Another object of the invention is to provide a distilling apparatus of this type which permits continuous operation inasmuch as the vapors to be distilled may be continuously introduced into the furnace and also may be continuously discharged therefrom in cracked condition, the conduits for said vapors and gases to be cracked being sufficiently large to eliminate or nearly eliminate the danger of deposits of soot or carbon, the flues for the passage of the combustion gases also being sufficiently large to reduce greatly the deposition of solid ingredients within said flues. The necessity of shutting down the operation in order to permit the furnace to be cleaned is thereby reduced to a minimum.

With these and numerous other objects in view, an embodiment of the invention is illustrated in the accompanying drawing to which a reference is made in the following specification and claims.

In the drawing:

Fig. 1 is a longitudinal sectional view of a distilling apparatus of this type, taken on line 1—1 of Fig. 3.

Fig. 2 is a transverse sectional view on line 2—2 of Fig. 1, or line 2—2 of Fig. 3.

Fig. 3 is a top plan view of the apparatus;

Figs. 4 to 9 are fragmentary sectional views taken on the lines 4—4, 5—5, 6—6, 7—7, 8—8, 9—9, respectively, of Fig. 2;

Fig. 10 shows at a reduced scale a front elevation of the distilling apparatus, and Fig. 11 is a rear elevation thereof on a similar scale.

The distilling apparatus comprises a masonry structure of brickwork or the like having the front wall, 1, the rear wall 2, a bottom 3, and top 4, as well as the side walls 5 and 6. A substantially horizontal fire bridge 7 extending from the front wall divides the interior of this masonry structure into a lower furnace chamber or fire box 8 and an upper conversion chamber 9, the two chambers communicating with each other through the space 10 remaining between the rear of the fire bridge 7 and the rear wall 2.

As shown in Figs. 2 and 9, this fire bridge 7 also is supported intermediate the lateral walls of the furnace by a central vertical wall 11 which may extend over the entire length of the bridge 7. A burner 12 furnishes fuel to the furnace chamber 8, or, as indicated in Fig. 10, each of the compartments created beneath the fire bridge 7 may have a burner for the introduction of fuel, the burners being provided with readily accessible valves 13, whereby they may be regulated independently of each other.

The conversion chamber 9 contains flues for the passage of the combustion gases, and interspaced between said flues are located conduits for the material to be distilled.

The chamber 9, therefore, contains one or more metallic conduits arranged to form a metallic lining over approximately the entire length of chamber 9.

A pair of bars 14 directly adjacent the lateral walls 5 and 6 of the furnace at the inside thereof rest on the fire bridge 7 and serve for supporting a cracking conduit 15 which has lateral walls 16 and spaced parallel horizontal walls 17. Between the horizontal walls 17 there are disposed a plurality of vertical spacing walls 18 subdividing this conduit into a plurality of longitudinal compartments which extend almost over the entire length of the apparatus.

From Fig. 2, it will also be noted that the lateral walls 16 are extended upward and downward beyond the horizontal walls 17 and that intermediate said lateral walls the conduit structure is reinforced by downward projecting ribs 19, which contribute to the reinforcement of the conduit and to its support, as one of the ribs 19 rests on a rib 20 which projects upward from the fire bridge 7.

A second conduit structure 21 also extending transversely over the width of the apparatus is supported on top of the cracking conduit 15, the second structure also comprising lateral walls 22 which may rest loosely on top of the lateral walls 16. This second structure also has a pair of horizontal walls 23 and a plurality of vertical intermediate partitions 24 to create compartments which extend approximately over the entire length of the furnace.

The upper conduit structure 21, furthermore, is provided on its lower face with a plurality of downward extending ribs 25 for dividing the space between the two conduit structures 15 and 21 into a plurality of longitudinal separated flues for the combustion gases, and one or more ribs 26 for strengthening this structure also extend upward therefrom into engagement with the top of the furnace whereby the entire assembled conduit structure is made extremely rigid and is effectively supported in the apparatus.

In the operation of the plant, the fuel is introduced through the burners 12 and ignited, and then travels in the furnace chamber 8 rearward, the gases turning about the rear end of the bridge 7, and while having their complete heat contents they travel forward in the flues formed between the cracking conduit 15 and the bridge 7, surrendering their heat to a large extent to said conduit from which it is transferred to the vapors therein, so that the latter are cracked.

The front end of the conduit 15 is provided with a pipe 27 through which the cracked gases are discharged from the apparatus. The combustion gases continue to travel about the closed front end of the cracking conduit 15 and about the discharge pipe 27, and continue their flow in a tortuous path again to the rear of the furnace, at the same time surrendering by this counter-current flow a portion of their remaining heat content to the cracking conduit 15 and also to the preheating conduit 21 into which the vapors from a distilling plant are introduced through the pipe 28. The gases have already surrendered a portion of their heat to the cracking conduit 15, and now serve for preheating the vapors in the conduit 21. The two conduit structures are connected by a communicating pipe or set of pipes 29, so that the vapors, after having flowed through the upper conduit structure 21 and after having been preheated, are delivered to the cracking conduit 15 at the rear end thereof.

The combustion gases flow about the rear end of the preheating conduit and about the communicating pipes 29 and then in the flues above the preheating conduit towards the front end of the apparatus, and finally escape through the stack 30. By this time they have surrendered their heat to a very satisfactory extent to the material to be treated, the transfer of heat being most efficient adjacent the cracking conduit 15, while a remaining portion of the heat is transferred to the vapors flowing in the preheating conduit 21. A clean-out door 31 may be provided in the front wall of the structure to remove the deposit from the conduits and flues whenever desired.

I claim:

1. In a distilling apparatus having end walls and lateral walls, a furnace chamber and a conversion chamber, the chambers communicating with each other adjacent an end wall, a bridge arch between said chambers, supporting bars resting on the bridge adjacent the lateral walls, a conduit resting on said supporting bars and having ribs projecting into the space above the bridge, said conduit having an upward extending projection at each lateral wall, a second conduit resting on said last named projections and spaced from the top of the first named conduit, the two superposed conduits extending each from a different end wall and terminating each short of the opposite end wall respectively and being serially connected with each other, whereby a continuous tortuous flue extending from the furnace chamber and passing below, between and above said conduits in the conversion chamber is provided.

2. In a distilling apparatus having end walls and lateral walls, a furnace chamber and a conversion chamber in superposed relation and communicating with each other at one end wall, a bridge arch extending between said chambers, supporting bars resting on said bridge, a conduit carried by said supporting bars between lateral walls of the apparatus and extending from one end wall to a point adjacent the opposite end wall but spaced therefrom, said conduit also being spaced from the bridge, a plurality of partitions within said conduit, ribs projecting upward from said conduit adjacent the lateral walls, a second conduit resting on said ribs and having ribs projecting towards the top of the conversion chamber, said second conduit also being provided with a plurality of partitions, the partitions of said conduits being staggered relatively to the ribs thereof and relatively to each other in the conduits, the two conduits being serially connected with each other, the space above, between and below the conduits providing a flue communicating with the furnace chamber and extending in an uninterrupted tortuous path from the furnace chamber through the conversion chamber.

EARNEST FREDERICK SKINNER.